US012659685B2

(12) United States Patent
Sun et al.

(10) Patent No.: US 12,659,685 B2
(45) Date of Patent: Jun. 16, 2026

(54) HEADREST SPEAKER, METHOD AND SYSTEM FOR AUDIO PROCESSING THEREOF

(71) Applicant: AAC Acoustic Technologies (Shanghai) Co., Ltd., Shanghai (CN)

(72) Inventors: Xuejing Sun, Los Angeles, CA (US); Xuyang Li, Shanghai (CN); Lianwu Chen, Shanghai (CN)

(73) Assignee: AAC Acoustic Technologies (Shanghai) Co., Ltd., Shanghai (CN)

( * ) Notice: Subject to any disclaimer, the term of this patent is extended or adjusted under 35 U.S.C. 154(b) by 136 days.

(21) Appl. No.: 18/782,002

(22) Filed: Jul. 23, 2024

(65) Prior Publication Data

US 2025/0247665 A1 Jul. 31, 2025

Related U.S. Application Data

(63) Continuation of application No. PCT/CN2024/074145, filed on Jan. 26, 2024.

(51) Int. Cl.
*H04S 7/00* (2006.01)

(52) U.S. Cl.
CPC ........... *H04S 7/303* (2013.01); *H04S 2400/11* (2013.01); *H04S 2420/01* (2013.01)

(58) Field of Classification Search
CPC .. H04S 7/303; H04S 2400/11; H04S 2420/01; H04R 2499/13
See application file for complete search history.

(56) References Cited

U.S. PATENT DOCUMENTS

| | | | | |
|---|---|---|---|---|
| 2014/0226824 | A1* | 8/2014 | Walsh | H04S 5/00 381/17 |
| 2019/0200159 | A1* | 6/2019 | Park | G10L 21/02 |
| 2019/0387349 | A1* | 12/2019 | Lyren | H04S 7/303 |
| 2021/0297781 | A1* | 9/2021 | Davis | H04R 5/033 |
| 2023/0403529 | A1* | 12/2023 | Oswald | H04S 3/008 |
| 2024/0187790 | A1* | 6/2024 | Von Saint-George | H04S 3/002 |

FOREIGN PATENT DOCUMENTS

| | | | | |
|---|---|---|---|---|
| WO | WO-2017223110 A1 | * 12/2017 | | H04S 5/02 |
| WO | WO-2021138421 A1 | * 7/2021 | | H04S 7/303 |
| WO | WO-2022184595 A1 | * 9/2022 | | H04R 1/345 |

* cited by examiner

*Primary Examiner* — David L Ton
(74) *Attorney, Agent, or Firm* — Wiersch Law Group

(57) ABSTRACT

Provided is a headrest speaker, and a method and system for audio processing. The method includes: acquiring relative position data of a listener head and a headrest speaker; determining first and second HRTF data corresponding to a binaural rendering algorithm and a cross talk cancellation algorithm according to the relative position data; fusing the first and the second HRTF data to obtain initial fused HRTF data; dynamically adjusting the initial fused HRTF data based on the relative position data to obtain target fused HRTF data, and processing an initial audio by using the target fused HRTF data to obtain a target audio; and playing the target audio through the headrest speaker. Through the above technical solution, the dynamic adjustment strategy is designed, so that good listening experience may be obtained no matter whether the listener is close to or away from the headrest speaker.

11 Claims, 2 Drawing Sheets

HEADREST SPEAKER, METHOD AND SYSTEM FOR AUDIO PROCESSING THEREOF

TECHNICAL FIELD

The present disclosure relate to the field of audio processing technologies, and in particular to a headrest speaker, and a method and system for audio processing.

BACKGROUND

A "headrest speaker" is an audio device installed in a headrest, which may be used in scenarios such as automobile seats and massage chairs, and provides a personalized audio experience for a listener. Current common playing strategies in the art include: independent playing of each seat headrest, synchronous playing of seat headrests, partition playing of seat headrest and interactive playing, or the like.

The above playing strategies are directly playing stereo sound, and the listener needs to maintain the head or both ears in a proper position to obtain an ideal auditory impression experience.

SUMMARY

Embodiments of the present disclosure provide a headrest speaker, and a method and system for audio processing.

One aspect of the present disclosure provides a method for audio processing of a headrest speaker, including: acquiring relative position data of a listener head and a headrest speaker; determining, according to the relative position data, first head-related transfer function (HRTF) data and second HRTF data corresponding to a binaural rendering algorithm and a cross talk cancellation algorithm, respectively; fusing the first HRTF data and the second HRTF data to obtain initial fused HRTF data; dynamically adjusting the initial fused HRTF data based on the relative position data to obtain target fused HRTF data, and processing an initial audio by using the target fused HRTF data to obtain a target audio; and playing the target audio through the headrest speaker.

As an improvement, the cross talk cancellation algorithm uses delayed and inverted signals, and the fusing the first HRTF data and the second HRTF data to obtain initial fused HRTF data includes: performing gain control on the delayed and inverted signals and mixing the delayed and inverted signals with binaural rendering signals to obtain the initial fused HRTF data.

As an improvement, prior to obtaining the initial fused HRTF data, the method further includes: processing the delayed and inverted signals in different frequency bands.

As an improvement, the dynamically adjusting the initial fused HRTF data based on the relative position data to obtain target fused HRTF data includes: using the first HRTF data as primary data to obtain target fused HRTF data when a distance between the listener head and the headrest speaker is less than a preset threshold; and using the second HRTF data as primary data to obtain target fused HRTF data when the distance between the listener head and the headrest speaker is greater than the preset threshold.

As an improvement, the dynamically adjusting the initial fused HRTF data based on the relative position data to obtain target fused HRTF data includes: performing smooth and dynamic adjustment on gains of the first HRTF data and the second HRTF data according to the distance between the listener head and the headrest speaker.

As an improvement, subsequent to the playing the target audio through the headrest speaker, the method further includes: obtaining feedback audio data; and calibrating one or more of the first HRTF data, the second HRTF data, and the threshold according to the feedback audio data.

As an improvement, the acquiring relative position data of the listener head and the headrest speaker includes: acquiring a distance between the listener head and the headrest speaker; and acquiring a height and an angle of the listener head, and determining a relative angle between two ears of the listener and the headrest speaker based on the distance, the height and the angle of the head of the listener.

As an improvement, the acquiring relative position data of the listener head and the headrest speaker includes: acquiring the distance between the listener head and the headrest speaker through a distance sensor or a pressure sensor. Additionally or alternatively, the acquiring the height and the angle of the listener head includes: acquiring the height and the angle of the listener head through a visual sensor.

As an improvement, the acquiring the height and the angle of the listener head includes: acquiring the height and the angle of the listener head according to a pre-established listener head model.

Another aspect of the present disclosure provides an audio processing system for a headrest speaker, including: an acquisition module, configured to acquire relative position data of a listener head and a headrest speaker; a head-related transfer function (HRTF) data module, configured to determine, according to the relative position data, first HRTF data and second HRTF data corresponding to a binaural rendering algorithm and a cross talk cancellation algorithm, respectively; a fusion module, configured to fuse the first HRTF data and the second HRTF data to obtain initial fused HRTF data; an audio generation module, configured to dynamically adjust the initial fused HRTF data based on the relative position data to obtain target fused HRTF data, and processing an initial audio by using the target fused HRTF data to obtain a target audio; and a play module, configured to play the target audio through the headrest speaker.

Another aspect of the present disclosure provides a headrest speaker adopts the method for audio processing of the headrest speaker as described above.

According to the headrest speaker, the method and system for audio processing in the embodiments of the present disclosure, the audio is processed by fusing the binaural rendering algorithm and the cross talk cancellation algorithm, and the dynamic adjustment strategy is designed, so that when the stereo binaural content is played on the headrest speaker, good listening experience may be obtained no matter whether the listener is close to or away from the headrest.

DESCRIPTION OF EMBODIMENTS

Figure 1:
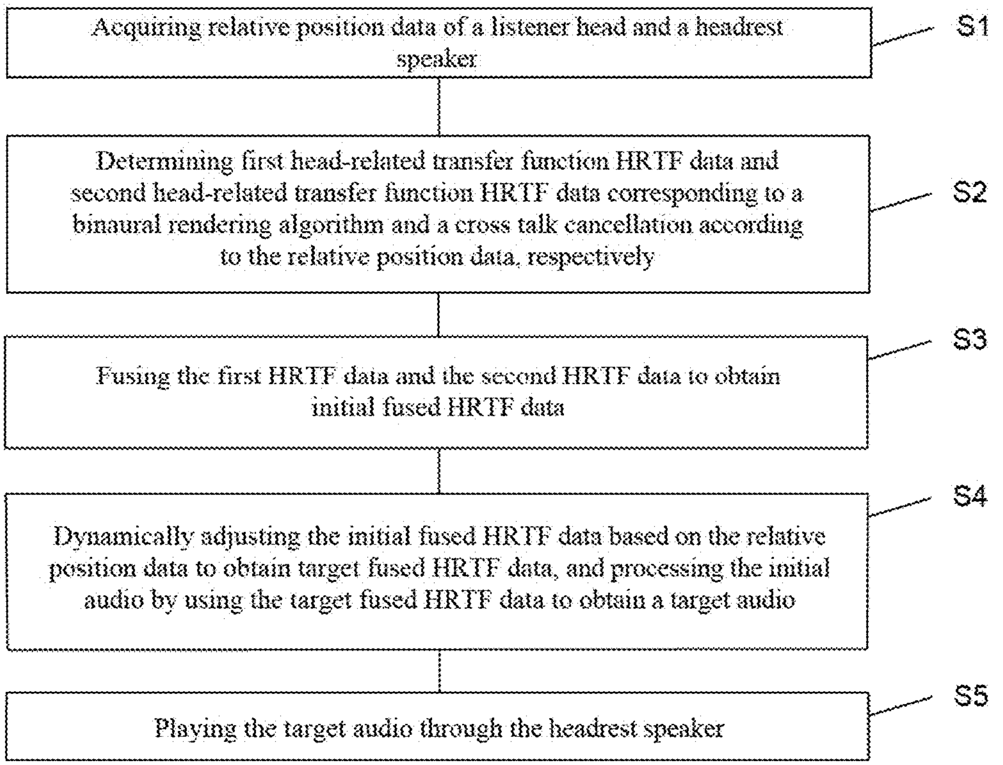
FIG. 1 is a schematic flowchart of a method for audio processing of a headrest speaker according to an embodiment of the present disclosure.

For a driving scenario, "vehicle-mounted headrest speaker" refers to an audio device installed in an automobile headrest for providing a personalized audio experience. The specific playing strategy will vary according to the functions and designs of the vehicle-mounted entertainment systems, and some common playing strategies are as follows:

1. Independent Play: each headrest speaker may play audio independently so that passengers may individually select music, audio books, or podcasts they would like to listen. This is typically accomplished by a passenger's mobile device, such as a smartphone or tablet, via a Bluetooth or Wi-Fi connection.
2. Full-Vehicle Synchronous Play: all headrest speakers play the same audio at the same time, such as playing music or radio selected by the driver or a certain passenger.
3. Partition Play: the automobile is divided into several "audio zones", and the speakers in each zone play different audio. For example, the driver and the front passenger may listen to the same audio, while the rear passenger may select another audio.
4. Interactive Play: This is a more complex strategy that may dynamically adjust the audio play according to the preferences of the passenger, the driving situation (such as driving or parking), and even the emotion of the passenger (detected by means such as facial recognition or biometric sensors).

These play strategies are directly playing stereo sound through headrest speakers, and when the head or ears of the listener are not in an ideal position, the auditory impression experience will be poor.

The cross talk cancellation (CTC) algorithm may be used to improve stereo sound experience, so that music sounds richer and vivid. In combination with binaural techniques, a more immersive audio environment may be created. In order to solve the above problem, by recording audio through a binaural rendering algorithm combined with CTC technology, passengers may be provided with a feeling that sound sources are around them, and the algorithm is dynamically adjusted according to the relative positions of the headrest and the listener, so that the listener may still obtain good listening experience when changing the head position, and the optimal playing strategy of playing stereo sound binaural content on the headrest speaker is achieved.

The technical solutions in embodiments of the present disclosure will be described clearly and completely below in connection with the drawings in the embodiments of the present disclosure, and it will be apparent that the embodiments described here are merely a part, not all of the embodiments of the present disclosure. All other embodiments acquired by those skilled in the art without creative efforts based on the embodiments of the present disclosure shall fall within the protection scope of the present disclosure.

Furthermore, features, structures or characteristics described herein may be combined into one or more embodiments in any proper ways. In the following description, many detailed details are provided to provide a full understanding of the embodiments of the present disclosure. However, those skilled in the art would realize that the embodiments of the present disclosure may be implemented without one or more of the certain details, or other methods, components, devices, steps, and the like may be applied. Otherwise, methods, devices, implementations, or operations well known in the art may be not illustrated or described herein for fear of obscuring aspects of the present disclosure.

The flowcharts shown in the drawings are merely illustrative, and do not necessarily include all content and operations/steps, nor do they necessarily have to be performed in the order described. For example, some operations/steps may also be decomposed, and some operations/steps may be merged or partially merged, so the actual execution order may be changed according to actual situations.

It should be understood, in the present disclosure, the terms "first", "second", "third" and the like are intended to describe various components, but not intended to limit these components. These terms are used to distinguish one component from another. Thus, a first component discussed below may be referred to as a second component without departing from the teachings of the disclosed concepts. As used in this disclosure, the term "and/or" includes any of the listed associated items and all combinations of one or more of the associated items.

Those skilled in the art may understand that the drawings are merely schematic diagrams of example embodiments, and modules or processes in the drawings are not necessary for implementing the present disclosure, and therefore cannot be used to limit the protection scope of the present disclosure.

As shown in FIG. 1, an embodiment of the present disclosure provides a method for audio processing of a headrest speaker, including:

Step S1, acquiring relative position data of a listener head and a headrest speaker.

In some embodiments, the relative position data of the listener head and the headrest speaker includes a distance between the listener head and the headrest speaker and a relative angle between the two ears of the listener and the headrest speaker. The distance between the listener head and the headrest speaker in the horizontal direction is detected by a distance sensor, such as an infrared sensor, an ultrasonic sensor or a laser sensor. Taking a typical left and right double-horn headrest speaker as an example, the distance sensor may be disposed between the two horns and cane detect outward. Considering the height difference of different listeners and the possible deviation of the head of the listeners, the detection range of the distance sensor may deviate outwards from one point, or a plurality of distance sensors are arranged to form a detection array to form a distance sensing surface to ensure reliable acquisition of the distance between the listener head and the headrest speaker.

Through a visual sensor, such as an in-vehicle camera, the height of the listener head is obtained, and then the relative height of the listener head and the headrest speaker in the vertical direction is obtained. Aiming at the head posture of the in-vehicle listener which may change at any time, the in-vehicle camera also needs to obtain the angle of the listener head, so that the relative positions of the two ears of the listener and the headrest speaker are calculated by combining the distance and the relative height of the listener head and the headrest speaker, and the relative angles of the listener's left and right ears and the headrest speaker will be more accurate.

In some embodiments, the distance between the listener head and the headrest speaker may also be acquired by a pressure sensor. For example, a pressure sensor (such as a piezoelectric sensor) is integrated into the headrest, when the head of the listener approaches or contacts the headrest, the pressure sensor detects a pressure change. According to the detected pressure change, it may be determined whether the listener approaches the headrest. Similarly, the pressure sensor may be mounted on the seat cushion or backrest of the seat to detect the weight distribution change of the listener, when the listener approaches or moves away from the headrest, the pressure distribution on the seat changes, and the distance between the head of the listener and the speaker of the headrest may be inferred according to these changes. The above two modes are used as a supplementary method for detecting the distance between the listener head and the headrest speaker, and in combination with various sensor technologies, more accurate and stable distance calculation may be provided.

In addition, the height and angle of the listener head may also be obtained according to a pre-established listener head model. Personalized customization is carried out for a single listener, the distance or relative position of two ears of the listener is collected in advance, even the specific relative position of the tympanic membrane in the two ears and the height and angle of the head of the listener in a normal state are collected, and the head model of the listener is established to replace a preset adaptive head model to carry out subsequent audio processing, so that the listener obtains better listening experience.

Step S2, respectively determining first head-related transfer function (HRTF) data and second head-related transfer function HRTF data corresponding to a binaural rendering algorithm and a cross talk cancellation algorithm according to the relative position data.

In some embodiments, the binaural rendering algorithm and the cross talk cancellation both select different HRTF data according to relative positions of the listener head and the headrest speaker.

An HRTF is a function used to simulate the effect of a head on sound. It is obtained by measuring or calculating the acoustic properties between the head and the ear. Typically, the measurement of HRTF is made by using an artificial ear model or real human head, and mathematical models and computer simulations are also used in some current studies to predict the effect of the head and ear on sound. These methods may compute a predicted HRTF based on head geometry and anatomy of the ear, as well as knowledge of acoustic properties. In the measurement process, different sound signals are sent to the ear by using a multi-channel speaker system, and then the received sound is recorded and analyzed by using a miniature microphone array at the ear, or is completed in simulation calculation, to obtain impact information of the head on the sound. After the measurement is completed, the obtained data is usually presented in a form of a set of frequency response functions. The frequency response functions represent changes of sound in a specific direction, and the frequency response function is called HRTF. For different directions, HRTF may provide sound source localization and spatial properties of sound in that direction. Whether measured or calculated, the HRTF may acquire audio data according to a specific direction and be used to simulate head influence to enhance 3D audio experience or sound source positioning.

A binaural rendering algorithm is an algorithm that implements three-dimensional sound effects by simulating a manner in which a human ear receives and processes sound. It uses information such as the position of the sound source and the HRTF to simulate the positioning and resolution of sound in space by calculating the difference between the audio signals received by the two ears. The HRTF data required for implementing the binaural rendering algorithm needs to consider factors such as the physical characteristics of sound propagation, the analytical ability of human ears, and the perception mechanism of human for sound localization.

A cross talk cancellation algorithm is a technique for canceling crosstalk during signal transmission. Crosstalk refers to a phenomenon of distortion or aliasing of received signals caused by mutual interference between signals during transmission. In audio signal transmission, for example, in an audio device or a speaker system, due to properties of audio signal propagation, sounds from different signal sources may interfere with each other, thereby causing crosstalk. The goal of the cross talk cancellation is to attenuate or remove the crosstalk signal from the received signal through a specific signal processing method to recover the accuracy and clarity of the original signal. The cross talk cancellation usually needs to estimate and extract features of a crosstalk signal by analyzing and modeling the signal, and then performs phase and power compensation on the crosstalk signal and an original signal to implement crosstalk compensation and cancellation. Common cross talk cancellation algorithms include adaptive filters, spatial mixing matrices, and the like. In a two-horn headrest speaker, it cancels unwanted sound from the speaker to the opposite ear by sending delayed and inverted signals from the other speaker.

After obtaining accurate data through various sensors in step S1, the distance and relative angle between the headrest speaker and the human ear may be calculated in real time, so as to determine HRTF data of the binaural rendering algorithm and the cross talk cancellation respectively.

Step S3, fusing the first HRTF data and the second HRTF data to obtain initial fused HRTF data.

In some embodiments, the cross talk cancellation adopts delayed and inverted signals, and may be used as a submodule of the binaural rendering algorithm according to the principle of the cross talk cancellation, a delay and inversion function is added in binaural rendering. After gain control is performed on the delayed and inverted signals, i.e., the second HRTF data, the HRTF data corresponding to the cross talk cancellation, and the first HRTF data, i.e., the HRTF data corresponding to the binaural rendering algorithm, are mixed.

Frequency division processing needs to be performed on the delayed and inverted signals, and the frequency division operation may use a filter such as a linkwitz-riley filter and a fast Fourier transform (FFT) filter. The process is divided into four different frequency bands: Low frequency (<500 Hz), medium-low frequency (500 Hz<f<1.5 kHz), medium-high frequency (1.5 kHz<f<5 kHz), and high frequency (>5 kHz). Since the sound is undirected in the low-frequency part, the ultralow-frequency part and the low-frequency part are not processed, and the high-frequency part is properly processed according to the properties of the high-frequency part, so as to retain more high-frequency details and maintain the processed sound quality. The intermediate frequency part (500 Hz<f<5 kHz) is mainly processed by sound gain, balance, compression, reverberation and the like of the audio signal. The frequency division processing may adjust the audio last played by the speaker more finely to achieve a better sound effect.

Finally, a gain value is determined to gain the HRTF data of the cross talk cancellation in combination with the distance and the relative angle between the two ears of the listener and the headrest speaker, and the HRTF data of the cross talk cancellation and the HRTF data of the two ears are fused and mixed to ensure that the cross talk cancellation effect may be achieved. The specific fusion steps are:

1. The two HRTF data are data aligned. First, it is necessary to ensure that the two HRTF datasets have the same sampling rate and data points. If sampling rates and data points of two data sets do not match, interpolation or sampling may be used for alignment.

2. For each frequency point, the frequency response functions of the two HRTF datasets are averaged. This may be achieved by averaging the amplitude, phase and other data of the frequency response function of the two HRTF datasets.
3. The averaged HRTF data is normalized to ensure that its frequency response function is within an appropriate range. Common normalization methods include setting the maximum value of the HRTF data to 1 or normalizing its total amplitude to 1.
4. The two HRTF datasets are mixed proportionally by simple linear weighted averaging. The mixing ratio may be adjusted according to actual requirements, for example, to control the contribution degree of each HRTF dataset in the final mixing according to factors such as the position and distance of the sound source.

Step S4, dynamically adjusting the initial fused HRTF data based on the relative position data to obtain target fused HRTF data, and processing the initial audio by using the target fused HRTF data, to obtain a target audio.

In some embodiments, after the above steps, the initial distance and relative angle between the head of the listener and the headrest speaker have been reflected in the initial fused HRTF data, and the initial fused HRTF data determined by the normal sitting posture of the listener has been determined. In some using scenarios, such as during the driving process of an automobile, the relative position changes between the listener head and the headrest speaker is mainly a distance change, that is, a situation in which the body inclines forwards or backwards. The measuring the distance between the listener head and the headrest speaker in real time, and dynamically adjusting the initial fused HRTF data based on the distance to obtain the target fused HRTF data for processing audio may specifically include: first, a suitable distance threshold is set, and if the distance between the listener head and the headrest speaker is less than the preset threshold, the gain of the first HRTF data is greater than the gain of the second HRTF data, and the target fused HRTF data is obtained by taking the first HRTF data as a primary, and at this time, the binaural rendering algorithm is the primary algorithm; if the distance between the listener head and the headrest speaker is greater than the preset threshold, the gain of the second HRTF data is greater than the gain of the first HRTF data, and the target fused HRTF data is obtained by taking the second HRTF data as a primary, and at this time, the cross talk cancellation is the primary algorithm.

In order to avoid sudden audio changes when switching between algorithms, smooth and dynamic adjustment may be respectively performed on gains of the first HRTF data and the second HRTF data according to the distance between the listener head and the headrest speaker. When the distance between the listener head and the headrest speaker changes, the gains of the first HRTF data and the second HRTF data are relatively increased and decreased. Specifically, when the distance between the listener head and the headrest speaker gradually increases, the gain of the first HRTF data gradually decreases, and the gain of the second HRTF data gradually increases. Otherwise, when the distance between the listener head and the headrest speaker decreases, the gain of the first HRTF data increases, and the gain of the second HRTF data decreases. In this process, when the distance between the listener head and the headrest speaker is equal to the preset threshold, the gains of the first HRTF data and the second HRTF data are equal. By means of the method, smooth transition between the two algorithms may be realized, and a listener may obtain more comfortable audio listening experience.

After the real-time target fused HRTF data is obtained through the above process, the initial audio may be processed in real time according to the target fused HRTF data. That is, the music selected by the user to be played or the audio of the radio station, and finally the target audio generated through the above algorithm is obtained. Firstly, the position of the headrest speaker is taken as the position of the audio source. The relative angle between the two ears of the listeners and the headrest speaker includes the azimuth angle and the pitch angle, and the position of the audio source is represented by the azimuth angle and the pitch angle. Then, the position of the audio source is matched with the direction corresponding to the target fused HRTF to determine the final position of the sound. Finally, the initial audio data is convoluted with the HRTF data to obtain the target audio data for speaker to play. The audio obtained by applying the HRTF has the properties of head influence, so that the listener may feel the spatial position, direction and depth of the sound source, and the immersion and reality of the audio are improved.

Step S5, playing the target audio through the headrest speaker.

In some embodiments, the initial audio and the obtained target audio in the above steps are both electrical signals, and the electrical signals of the target audio are converted into sound signals for playing through the headrest speaker. The speaker is mainly composed of an electromagnetic driving unit and a vibrating diaphragm, an electric signal may firstly pass through an amplifier to amplify a low-voltage audio signal into a sufficiently large current. The amplified current then passes through a coil connected to the electromagnetic driving unit of the speaker to generate a magnetic field, and the magnetic field interacts with a permanent magnet in the electromagnetic driving unit. According to the Ampere law, when the coil in the electromagnet is subjected to current, the coil is subjected to a reverse magnetic field force to drive the vibrating diaphragm to vibrate, and the vibration of the vibrating diaphragm generates pressure waves, namely sound waves, in the air to complete playing of the target audio.

According to a method for audio processing of a headrest speaker in the embodiments of the present disclosure, the audio is processed by fusing the binaural rendering algorithm and the cross talk cancellation algorithm, and the dynamic adjustment strategy is designed, so that when the stereo sound binaural content is played on the headrest speaker, good listening experience may be obtained no matter whether the listener is close to or away from the headrest.

Figure 2:
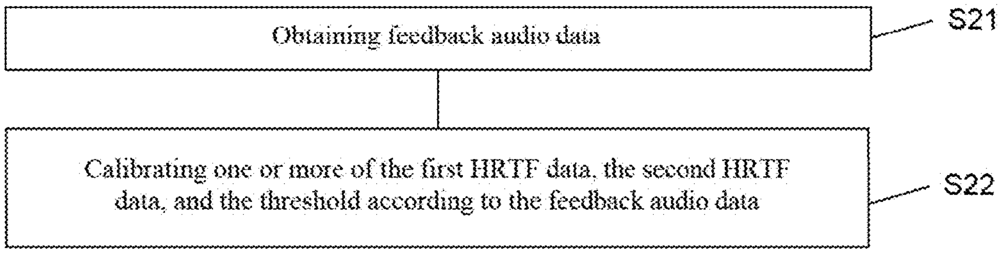
FIG. 2 is a schematic flowchart of a method for feedback calibration according to an embodiment of the present disclosure.

As shown in FIG. 2, after playing the target audio through the headrest speaker, the method further includes:

Step S21, obtaining feedback audio data.

Step S22, calibrating one or more of the first HRTF data, the second HRTF data, and the threshold according to the feedback audio data.

In some embodiments, to ensure that dynamic adjustments are effective in practical applications, feedback and calibration mechanisms may be used to optimize their performance. First, a sound receiving device is used to collect an audio response in an automobile, for example, a tester wears a miniature microphone at two ears to manually collect data, or a microphone device at another position in the automobile is used to acquire feedback audio data of sound played by a headrest speaker. The acquired feedback audio data is then analyzed, compared to a target sound effect expected to be achieved, the first HRTF data, the second HRTF data, or a distance threshold for dynamic adjustment is calibrated, and a smooth transition strategy is adopted.

Figure 3:
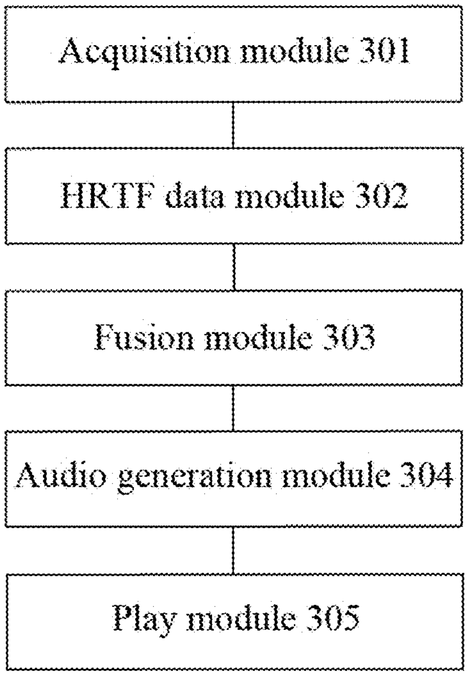
FIG. 3 is a structural schematic diagram of an audio processing system for a headrest speaker according to an embodiment of the present disclosure.

As shown in FIG. 3, embodiments of the present disclosure provide an audio processing system for a headrest speaker, including:

An acquisition module 301, configured to acquire relative position data of the listener head and the headrest speaker;

A HRTF data module 302, configured to respectively determine first head-related transfer function HRTF data and second head-related transfer function HRTF data corresponding to a binaural rendering algorithm and a cross talk cancellation algorithm according to the relative position data;

A fusion module 303, configured to fuse the first HRTF data and the second HRTF data to obtain initial fused HRTF data;

An audio generation module 304, configured to dynamically adjust the initial fused HRTF data based on the relative position data to obtain target fused HRTF data, and processing the initial audio by using the target fused HRTF data to obtain a target audio; and A play module 305, configured to play the target audio through the headrest speaker.

The headrest speaker audio processing system is configured to implement the method for audio processing of the headrest speaker described in the above embodiments, and the specific implementation process has been described in the above embodiments, and details are not described herein again.

According to an audio processing system of a headrest speaker in the embodiments of the present disclosure, the audio is processed by fusing the binaural rendering algorithm and the cross talk cancellation algorithm, and the dynamic adjustment strategy is designed, so that when the stereo sound binaural content is played on the headrest speaker, good listening experience may be obtained no matter whether the listener is close to or away from the headrest.

Embodiments of the present disclosure provide a headrest speaker adopts the method for audio processing of the headrest speaker as described above; and/or adopts the audio processing system of the headrest speaker as described above.

According to a headrest speaker in the embodiments of the present disclosure, audio processing is performed through the built-in headrest speaker audio processing system described in the above embodiments, or by using the method for audio processing of the headrest speaker as described in the above embodiments, which may ensure that good listening experience is obtained regardless of whether the listener is close to or away from the headrest when the stereo sound binaural content is played on the headrest speaker.

Embodiments of the present disclosure provide a computer-readable storage medium storing a computer program, when the computer program is executed by a processor, the method for audio processing of the headrest speaker as described above.

The computer-readable storage medium may be included in the system and the electronic device of the present disclosure, or may exist alone.

The computer-readable storage medium may be any tangible medium containing or storing a program, which may be an electronic, magnetic, optical, electromagnetic, infrared, semiconductor system, apparatus, and device, and more specific examples include but are not limited to: An electrical connection having one or more wires, a portable computer diskette, a hard disk, an optical fiber, a random access memory (RAM), a read-only memory (ROM), an erasable programmable read-only memory (EPROM or Flash memory), a portable compact disk read-only memory (CD-ROM), an optical storage device, a magnetic storage device, or any suitable combination thereof.

The computer-readable storage medium may also include data signals propagating in baseband or as part of a carrier wave, carrying computer-readable program code, specific examples of which include, but are not limited to, electromagnetic signals, optical signals, or any suitable combination thereof.

It can be understood that the above implementations are merely exemplary implementations used for illustrating the principles of the present disclosure, but the present disclosure are not limited thereto. For those skilled in the art, various modifications and improvements may be made without departing from the spirit and essence of the present disclosure, and these modifications and improvements are further considered as the protection scope of the present disclosure.

What is claimed is:

1. A method for audio processing of a headrest speaker, comprising:

acquiring relative position data of a listener head and a headrest speaker;

determining, according to the relative position data, first head-related transfer function (HRTF) data and second HRTF data corresponding to a binaural rendering algorithm and a cross talk cancellation algorithm, respectively;

fusing the first HRTF data and the second HRTF data to obtain initial fused HRTF data;

dynamically adjusting the initial fused HRTF data based on the relative position data to obtain target fused HRTF data, and processing an initial audio by using the target fused HRTF data to obtain a target audio; and playing the target audio through the headrest speaker.

2. The method as described in claim 1, wherein the cross talk cancellation algorithm uses delayed and inverted signals, and the fusing the first HRTF data and the second HRTF data to obtain initial fused HRTF data comprises:

performing gain control on the delayed and inverted signals and mixing the delayed and inverted signals with binaural rendering signals to obtain the initial fused HRTF data.

3. The method as described in claim 2, wherein prior to obtaining the initial fused HRTF data, the method further comprises:

processing the delayed and inverted signals in different frequency bands.

4. The method as described in claim 1, wherein the dynamically adjusting the initial fused HRTF data based on the relative position data to obtain target fused HRTF data comprises:

using the first HRTF data as primary data to obtain target fused HRTF data when a distance between the listener head and the headrest speaker is less than a preset threshold; and using the second HRTF data as primary data to obtain target fused HRTF data when the distance between the listener head and the headrest speaker is greater than the preset threshold.

5. The method as described in claim 4, wherein the dynamically adjusting the initial fused HRTF data based on the relative position data to obtain target fused HRTF data comprises:

performing smooth and dynamic adjustment on gains of the first HRTF data and the second HRTF data according to the distance between the listener head and the headrest speaker.

6. The method as described in claim 4, wherein subsequent to the playing the target audio through the headrest speaker, the method further comprises:

obtaining feedback audio data; and calibrating one or more of the first HRTF data, the second HRTF data, and the threshold according to the feedback audio data.

7. The method as described in claim 1, wherein the acquiring relative position data of the listener head and the headrest speaker comprises:

acquiring a distance between the listener head and the headrest speaker; and acquiring a height and an angle of the listener head, and determining a relative angle between two ears of the listener and the headrest speaker based on the distance, the height and the angle of the head of the listener.

8. The method as described in claim 7, wherein the acquiring relative position data of the listener head and the headrest speaker comprises:

acquiring the distance between the listener head and the headrest speaker through a distance sensor or a pressure sensor; and/or the acquiring the height and the angle of the listener head comprises:

acquiring the height and the angle of the listener head through a visual sensor.

9. The method as described in claim 7, wherein the acquiring the height and the angle of the listener head comprises:

acquiring the height and the angle of the listener head according to a pre-established listener head model.

10. An audio processing system for a headrest speaker, comprising:

an acquisition module, configured to acquire relative position data of a listener head and a headrest speaker;

a head-related transfer function (HRTF) data module, configured to determine, according to the relative position data, first HRTF data and second HRTF data corresponding to a binaural rendering algorithm and a cross talk cancellation algorithm, respectively;

a fusion module, configured to fuse the first HRTF data and the second HRTF data to obtain initial fused HRTF data;

an audio generation module, configured to dynamically adjust the initial fused HRTF data based on the relative position data to obtain target fused HRTF data, and processing an initial audio by using the target fused HRTF data to obtain a target audio; and a play module, configured to play the target audio through the headrest speaker.

11. A headrest speaker, wherein the headrest speaker adopts the method for audio processing of the headrest speaker as described in claim 1.

* * * * *